(12) United States Patent
Yao et al.

(10) Patent No.: US 10,339,611 B2
(45) Date of Patent: Jul. 2, 2019

(54) SYSTEMS AND METHODS FOR PAGE RECOMMENDATIONS

(71) Applicant: Facebook, Inc., Menlo Park, CA (US)

(72) Inventors: Jinyi Yao, Issaquah, WA (US); James Wah Hou Wong, Bellevue, WA (US); Jason Brewer, Kirkland, WA (US); Bradley Ray Green, Snohomish, WA (US)

(73) Assignee: Facebook, Inc., Menlo Park, CA (US)

( * ) Notice: Subject to any disclaimer, the term of this patent is extended or adjusted under 35 U.S.C. 154(b) by 343 days.

(21) Appl. No.: 14/565,237

(22) Filed: Dec. 9, 2014

(65) Prior Publication Data

US 2016/0162503 A1   Jun. 9, 2016

(51) Int. Cl.
  *G06Q 30/02* (2012.01)
  *G06Q 50/00* (2012.01)
  *G06F 16/9535* (2019.01)

(52) U.S. Cl.
  CPC ......... *G06Q 50/01* (2013.01); *G06F 16/9535* (2019.01); *G06Q 30/0275* (2013.01)

(58) Field of Classification Search
  None
  See application file for complete search history.

(56) References Cited

U.S. PATENT DOCUMENTS

| | | | |
|---|---|---|---|
| 8,495,143 B2 | 7/2013 | Zhou et al. | |
| 2003/0033292 A1* | 2/2003 | Meisel | G06Q 30/02 |
| 2011/0258049 A1* | 10/2011 | Ramer | G06F 17/30867 |
| | | | 705/14.66 |
| 2013/0124297 A1* | 5/2013 | Hegeman | G06Q 30/02 |
| | | | 705/14.42 |
| 2014/0006172 A1* | 1/2014 | Pardoe | G06Q 30/08 |
| | | | 705/14.71 |
| 2014/0208234 A1* | 7/2014 | Amit | G06Q 30/0273 |
| | | | 715/753 |
| 2015/0324933 A1* | 11/2015 | Allen | H04L 65/403 |
| | | | 705/26.4 |

OTHER PUBLICATIONS

The Economist, The Way the Brain Buys (Dec. 18, 2008), http://www.economist.com/node/12792420 (last visited Jan. 20, 2018) (Year: 2008).*

(Continued)

*Primary Examiner* — William Spieler
(74) *Attorney, Agent, or Firm* — Sheppard Mullin Richter & Hampton LLP

(57) ABSTRACT

Systems, methods, and non-transitory computer readable media configured to determine seed content items based on interests of a user. Candidate content items can be determined for potential presentation to the user based at least in part on the seed content items. Features associated with the candidate content items can be processed to generate probabilities that the user will perform interactions with the candidate content items. Values can be assigned to the candidate content items based on the probabilities that the user will perform interactions with the candidate content items and the importance of the interactions. The values can be provided as bid values to an auction system to determine constraints regarding presentation of the candidate content items. Presentation of the candidate content items can be optimized.

13 Claims, 10 Drawing Sheets

(56) References Cited

OTHER PUBLICATIONS

Bain Insights, From Shelf to Checkout: How Brands Can Stand Out at Stores, Forbes (Jul. 10, 2014), https://www.forbes.com/sites/baininsights/2014/07/10/from-shelf-to-checkout-how-brands-can-stand-out-at-stores (last visited Jan. 20, 2018) (Year: 2014).*

Learmonth, #Winning on Twitter: The Top 10 Promoted Tweets, http://adage.com/article/digital/winning-twitter-top-10-promoted-tweets/227437/ (last visited Jan. 20, 2018) (Year: 2011).*

Bouscaren, Should You Run Facebook Ads or a Boosted Post?, https://blog.privy.com/blog/2014/8/should-you-run-facebook-ads-or-a-boosted-post (last visited Jan. 20, 2018) (Year: 2014).*

* cited by examiner

SYSTEMS AND METHODS FOR PAGE RECOMMENDATIONS

FIELD OF THE INVENTION

The present technology relates to the field of content provision. More particularly, the present technology relates to techniques for recommending pages.

BACKGROUND

Today, people often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

Under conventional approaches, a user may navigate to or be presented with various content items in a social network. The content items can come from pages associated with members of the social network. In some instances, the content items may be of high interest to the user. If the user expresses interest in a particular content item, the social network may attempt, based on the content item, to provide to the user additional content items that likewise would be of high interest to the user. Provision of additional content items that are of high interest to the user enhances user experience and can help realize the full potential of the social network. Unfortunately, attempts to provide such additional content items and to maintain a high level of interest from the user often fail.

The growing size of social networks also poses problems with respect to the goal of providing content items of high interest to the user. As available content grows in amount, in theory, the likelihood of finding more content items of high interest to the user should increase. However, in practice, the ability to identify content items of high interest to the user can be complicated by the sheer volume of content.

SUMMARY

Various embodiments of the present disclosure can include systems, methods, and non-transitory computer readable media configured to the determine seed content items based on interests of a user. Candidate content items can be determined for potential presentation to the user based at least in part on the seed content items. Features associated with the candidate content items can be processed to generate probabilities that the user will perform interactions with the candidate content items. Values can be assigned to the candidate content items based on the probabilities that the user will perform interactions with the candidate content items and the importance of the interactions. The values can be provided as bid values to an auction system to determine constraints regarding presentation of the candidate content items. Presentation of the candidate content items can be optimized.

In an embodiment, the seed content items are seed pages and the candidate content items are candidate pages.

In an embodiment, the seed content items are a subset of content items of which the user has indicated approval.

In an embodiment, the candidate content items are prioritized based on at least one of a language match between a language of a candidate content item and language fluency of the user and quality of the candidate content item.

In an embodiment, the processing features further comprises applying machine learning models based on the features.

In an embodiment, the candidate content items are sorted according to the values associated with the candidate content items to determine a threshold number of the highest values, wherein the values provided as bid values to the auction system includes the threshold number of the highest values.

In an embodiment, the constraints determined by the auction system include a time constraint and a space constraint regarding presentation of each candidate content item.

In an embodiment, the optimizing presentation of the candidate content items further comprises selecting for presentation to the user at least a first candidate content item having a highest value.

In an embodiment, the optimizing presentation of the candidate content items further comprises selecting for presentation to the user a second candidate content item having a value within a confidence threshold of the highest value.

In an embodiment, a reference is provided for presentation to the user explaining why a candidate content item is being presented to the user.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
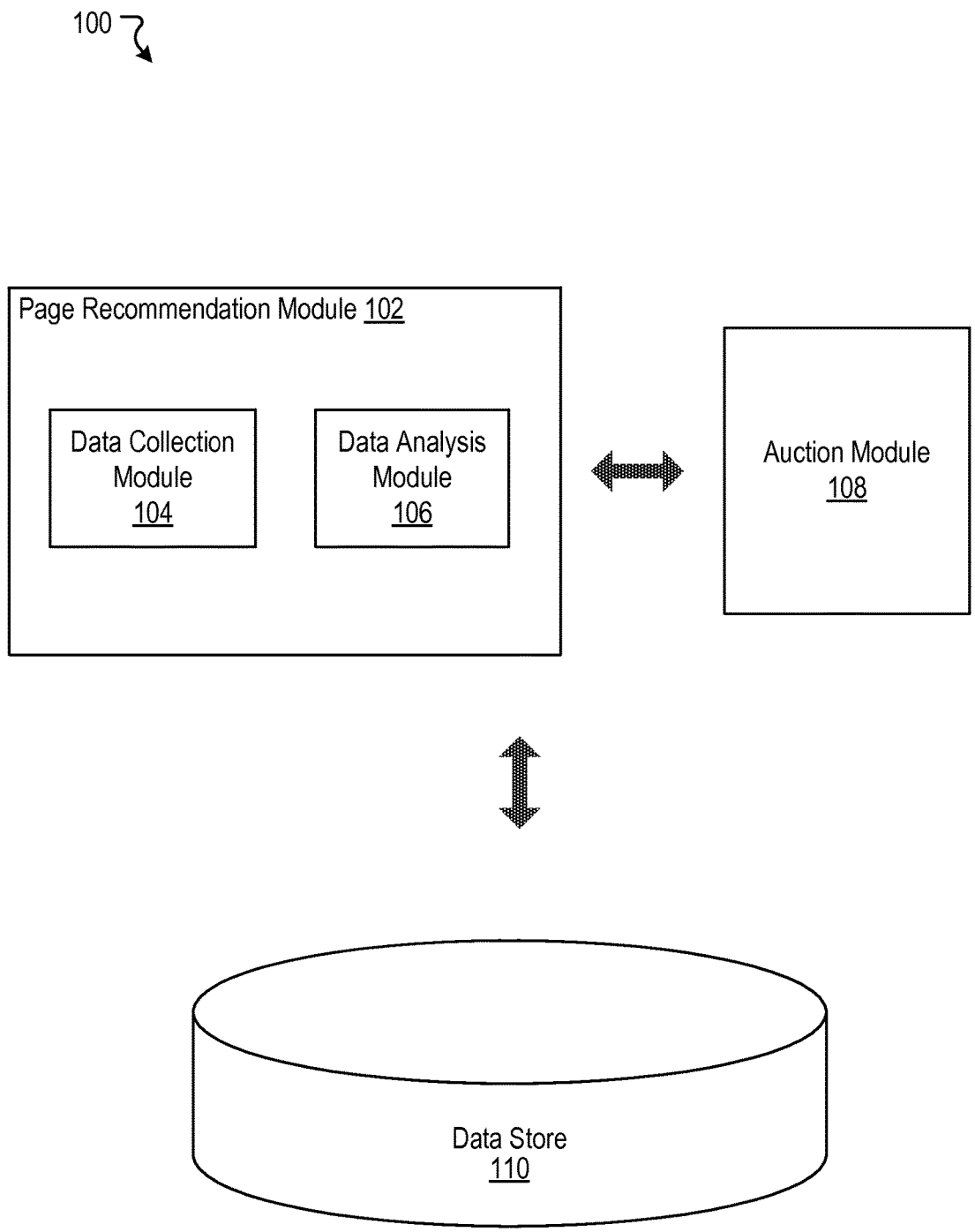
FIG. 1 illustrates a system including an example page recommendation module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Providing Page Recommendations to Users

People use computing devices (or systems) for a wide variety of purposes. Computing devices can provide different kinds of functionality. Users can utilize their computing devices to produce information, access information, and share information. In some cases, users can use their computing devices to generate and publish content postings. Content items can include any combination of content types, such as text, images, videos, and audio. The content items can be shared for consumption by others through a social networking system. The content items can be shared in a variety of formats, such as posts to the social networking system.

The conventional presentation of content items can entail many disadvantages. When a user indicates approval of or interest in a first content item, the social networking system may attempt to identify additional content items that are of interest to the user. However, when presented to the user, the additional content items may not be desirable to the user because they are not well matched with the interests or profile of the user. In such circumstances, the user can be provided with content items that the user deems unfamiliar, irrelevant, or worse. As a result, the user experience of the social networking system can suffer.

The growing size of social networks also poses problems with respect to the goal of providing content items of high interest to the user. As membership with the social network grows, so does the content posted to the social network. The large growth in content provided by the social network poses great potential toward the goal of providing content items desired by the user. In practice, however, the delivery of content items of high interest to the user can be complicated by the sheer volume of content available on the social network. Although content items desired by the user may exist somewhere in the social network, they can be difficult to discern among the vast collections of other content items that may be less relevant to the user.

An improved approach to the presentation of additional content items overcomes the foregoing and other disadvantages associated with conventional approaches. The present disclosure can identify seed content items that a user has expressed interest in or otherwise indicated approval of (e.g., liked or fanned). A subset of the identified seed content items can be used to determine the profile and interests of the user. One or more of a variety of techniques can be used to generate candidate content items for potential presentation to the user. The generated candidate content items can be processed to extract various features. In addition, targeting considerations can be analyzed with respect to the candidate content items to account for the language preferences of the user and to prioritize candidate content items that have high quality.

Further, according to the present disclosure, the features relating to the candidate content items and the targeting considerations can be applied to machine learning techniques to predict the probability of different interactions by the user with the candidate content item. Values for the predicted interactions can be assigned according to business considerations. A bid value for each candidate content item can be determined based on the assigned values and provided to an auction system to determine time and space constraints regarding the potential presentation of the candidate content item to the user in relation to the presentation of other content to the user. A randomization technique can vary the presentation of candidate content items so that candidate content items that do not have the highest score can be presented to the user in certain circumstances. An attribution technique can be performed so that when candidate content items are presented for the user an explanation is provided to the user regarding why the candidate content items is being presented to the user.

As used herein, content items, including seed content items and candidate content items, can include any item of content that may be provided by the social networking system or that may be accessible by a member of the social networking system. A page or screens associated with a member of the social networking system is just one example of a content item. Although a "page" may be referenced herein in certain discussions or with respect to certain embodiments, it should be understood that any other type of content item additionally or alternatively can be used.

FIG. 1 illustrates an example system 100 including an example page recommendation module 102 configured to determine candidate content items to present in real time (or near real time) to a user of a social networking system, according to an embodiment of the present disclosure. The candidate content items can be presented to the user after the user has expressed interest in or otherwise indicated approval of (e.g., liked) a seed content item. The seed content item can include, for example, a content item in a newsfeed (e.g., story) supported by the social networking system that is presented to the user, a timeline of a page associated with a member of the social networking system, or any other type of content item. The candidate content items can include, for example, pages associated with members of the social networking system that exhibit sufficient relatedness with regard to the seed content item so as to maintain the interest of the user and to cause the user to interact with or perform a conversion with respect to the pages.

The page recommendation module 102 can include a data collection module 104 and a data analysis module 106. The example system 100 can also include an auction module 108 and at least one data store 110. The components (e.g., modules, elements, etc.) shown in this figure and all figures herein are exemplary only, and other implementations may include additional, fewer, integrated, or different components. Some components may not be shown so as not to obscure relevant details.

In some embodiments, the page recommendation module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the page recommendation module 102 can be implemented, in part or in whole, as software running on one or more computing devices or systems, such as on a user or client computing device. For example, the page recommendation module 102 can be implemented as or within an application (e.g., app), a program, or an applet, etc., running on a user computing device or client computing system. In some instances, the page recommendation module 102 can, in part or in whole, be implemented within or configured to operate in conjunction with a social networking system (or service), such as the social networking system 830 of FIG. 8. It should be understood that many variations are possible.

The data collection module 104 can be configured to facilitate collection of data relating to online user behavior and other characteristics regarding pages of the social networking system. The pages for which data relating to online user behavior and other characteristics are collected can include seed pages (or other seed content items) in which the user has indicated approval and candidate pages (or other candidate content items) that are considered for presentation to the user. The data relating to online user behavior and other characteristics regarding pages also may include, for example, the number of impressions and the number of conversions for pages. A conversion can be any desired action taken by the user in relation to the candidate page, including but not limited to liking the page, subscribing to the page, sharing the page, saving the page, posting to the page, purchasing from the page, communicating with the page, etc. The data relating to online user behavior and other characteristics regarding pages also may include, for example, the data required by the techniques used to identify candidate content items, as discussed in more detail herein. The data collection module 104 can retrieve the data relating to online user behavior and other characteristics, such as the conversion data and the impression data, and provide such data to the data analysis module 106.

The data analysis module 106 can be configured to determine one or more candidate pages for presentation to the user. The data analysis module 106 can identify content items that a user has expressed interest in or otherwise indicated approval of (e.g., liked or fanned). Based on the content items, a subset of the identified content items can be selected. The subset of the identified content items, or seed content items, can be used to determine the profile and interests of the user. One or more of a variety of techniques can be used to generate candidate content items for potential presentation to the user. Some techniques to generate candidate content items are based on the determined profile and interests of the user derived from the seed content items. Some techniques to generate candidate content items are not based on the seed content items.

The data analysis module 106 further can process the generated candidate content items to extract various features. The features can include any relevant metrics or parameters that reflect characteristics of or online user behavior relating to candidate content items. In addition, targeting considerations can be analyzed with respect to the candidate content items to account for the language preferences of the user and to prioritize candidate content items that have high quality. The features relating to the candidate content items and the targeting considerations can be applied to machine learning techniques to predict the probability of different interactions by the user with the candidate content item. The values of the predicted interactions are assigned according to business considerations. A bid value for each candidate content item is determined based on the assigned values.

The data analysis module 106 can provide the bid value for a candidate content item to the auction module 108 to determine time and space constraints regarding the potential presentation of the candidate content item to the user. The time and space constraints associated with the candidate content item may be determined in relation to the presentation of other content to the user. Other content may include, for example, advertisements, suggestion of connections for the user, etc. The auction module 108 is described in more detail in U.S. patent application Ser. No. 13/294,052, entitled "Multi-Dimensional Advertisement Bidding", filed on Nov. 10, 2011, which is incorporated by reference in its entirety herein.

The data analysis module 106 can account for other considerations in the presentation of candidate content items for the user. A randomization technique can vary the presentation of candidate content items so that candidate content items that do not have the highest value can be presented to the user in certain circumstances. An attribution technique can be performed so that when candidate content items are presented for the user an explanation is provided to the user regarding why the candidate content items are being presented to the user.

The data store 110 can be configured to store and maintain various types of data, such as the data relating to online user behavior and other characteristics regarding pages. For example, the data store 110 can store the conversion data and the impression data for seed pages and candidate pages. The conversion data and the impression data for seed pages and candidate pages can reflect any suitable historical time period, including for example, one week, 30 days, 60 days, six months, a year, five years, etc. The data store 110 can also maintain data regarding the historical behavior of the user throughout the social networking system and, in particular, the interactions of the user with various content items of the social networking system.

The data store 110 can also maintain other information associated with the social networking system. The information associated with the social networking system can include data about users, social connections, social interactions, locations, geo-fenced areas, maps, places, events, groups, posts, communications, content, account settings, privacy settings, a social graph, and various other types of data. In some implementations, the data store 110 can store information associated with users, such as user identifiers, user information, user specified settings, content produced by users, and various other types of user data. As shown in the example system 100, the page recommendation module 102 can be configured to communicate and/or operate with the data store 110.

Figure 2:
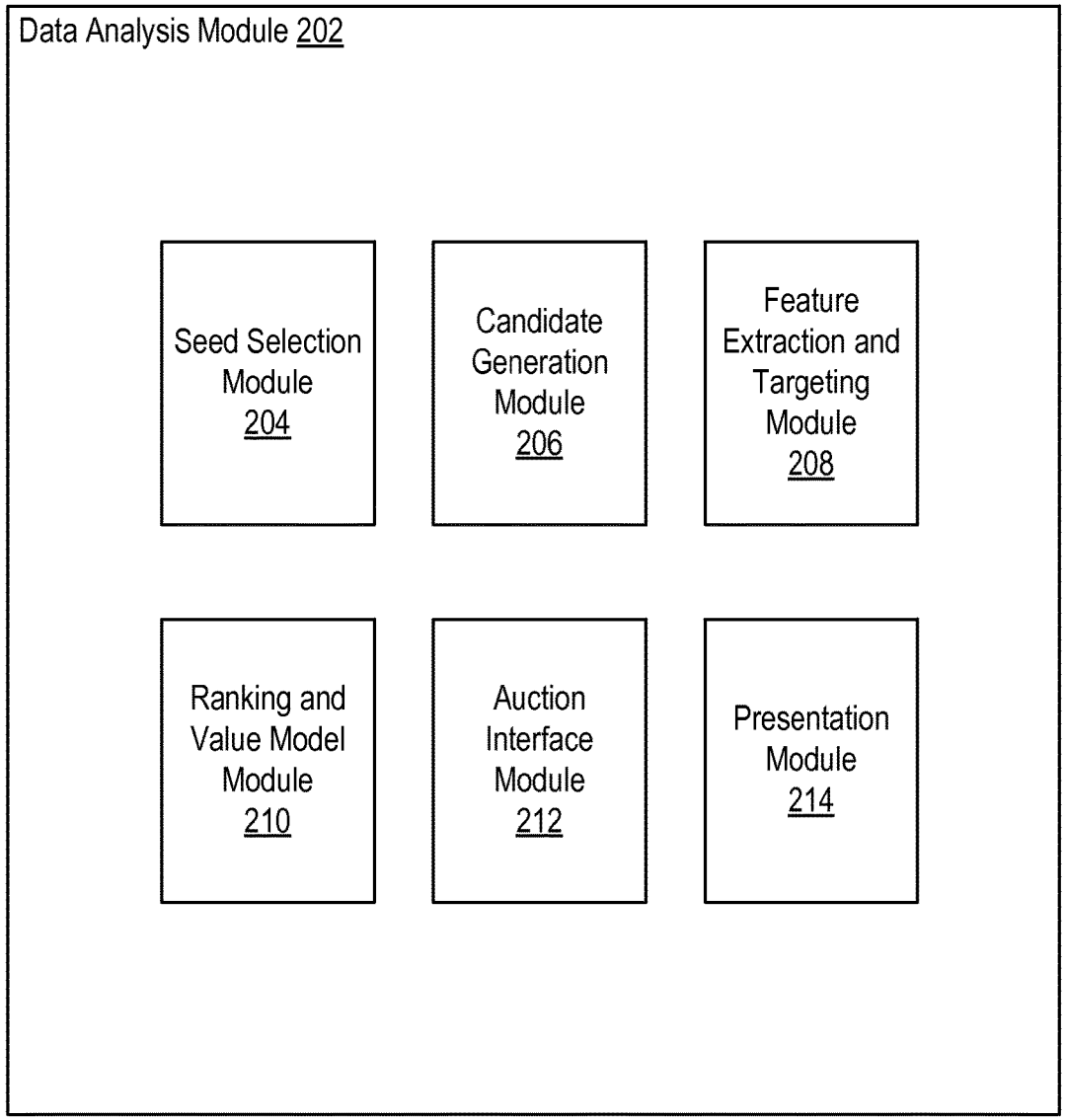
FIG. 2 illustrates an example data analysis module, according to an embodiment of the present disclosure.

FIG. 2 illustrates an example data analysis module 202 configured to determine one or more candidate pages for presentation to a user, according to an embodiment of the present disclosure. In some embodiments, the data analysis module 106 of FIG. 1 can be implemented with the data analysis module 202. As shown in the example of FIG. 2, the data analysis module 202 can include a seed selection module 204, a candidate generation module 206, a feature extraction and targeting module 208, a ranking and value model module 210, an auction interface module 212, and a presentation module 214.

The seed selection module 204 can determine the interests of the user. The seed selection module 204 can obtain data regarding the interactions of the user with pages on the social networking system. For example, the seed selection module 204 can determine the pages that the user has expressed an interest in or otherwise expressed approval of (e.g., fanned or liked). As another example, the seed selection module 204 can determine the type and extent of the user's interactions with the pages of which the user has express approval. The type of such interactions can include, for example, the number and time of visits to the page, the number of content items accessed by the user, the number of shares from the page by the user, the number of posts to the page, etc.

The seed selection module 204 can select a subset of the pages of which the user has expressed approval. The subset of pages can be selected based on the type and extent of the user's interactions with the pages to identify the pages that the user has interacted with most. In some embodiments, the selection of the subset of pages can be based on the affinity or connection strength between the user and pages as reflected in the social graph. The subset of pages, which can be referred to as seed pages, accordingly can provide an indication of user interest that can be used in the determination of candidate pages.

The candidate generation module 206 can identity candidate pages. The candidate pages can be identified by one or more of a multitude of techniques to identify candidate pages. In some embodiments, the techniques to identify candidate pages can be based on seed pages of the user. The techniques based on seed pages can determine candidate pages based on page similarity with seed pages. The techniques based on seed pages can include, for example, matrix factorization (and nearest neighbor), topic authorities, co-interaction, and best-edge. In some embodiments, the techniques to identify candidate pages are not based on seed pages of the user. The techniques not based on seed pages can include, for example, location based candidates and profile based candidates.

The candidate generation module 206 can selectively generate candidate pages from a selected combination of the techniques to identify candidate pages. For example, the selected combination could include one, many, or all of the techniques to identify candidate pages. As another example, the selected combination could include one or more of the techniques based on seed pages and one or more of the techniques not based on seed pages. The determination of the selected combination of techniques can be based on a variety of factors including but not limited to the historical success of the selected combination in providing candidate pages for the user, the generation of a threshold number of candidate pages, etc.

The feature extraction and targeting module 208 can generate various features associated with the candidate pages generated by the candidate generation module 206. The features can include any metric or parameter associated with the candidate pages (and seed pages) and online user behavior in connection with the pages. In addition, the feature extraction and targeting module 208 can target (or filter) candidate pages for the user based on the features associated with the candidate pages. For example, candidate pages prepared in a language or languages preferred by the user can be prioritized for the user. Further, the candidate pages can be analyzed for high quality and candidate pages reflecting a threshold level of high quality can be prioritized. The feature extraction and targeting module 208 is discussed in more detail herein.

The ranking and value model module 210 can determine various probabilities of user interaction with the candidate pages. The ranking and value model module 210 can determine such probabilities from machine learning models based on the features extracted by the feature extraction and targeting module 208. The machine learning models can be trained based on past user behavior. In addition, the ranking and value model module 210 also can assign a value to each candidate page based on the business importance of the predicted user interactions associated with the candidate page. The candidate pages can be sorted based on their values. A threshold number of candidate pages with the highest values can be identified. The values of the selected candidate pages can be provided as bid values to the auction interface module 212. The ranking and value model module 210 is discussed in more detail herein.

The auction interface module 212 can serve as an interface to the auction module 108. The auction interface module 212 can provide the bid values associated with the threshold number of candidate pages with the highest values to the auction module 108. The auction interface module 212 can receive from the auction module 108 information regarding constraints on the presentation of each candidate page. The constraints can include time and space requirements for the presentation of the candidate page for the user given competing content that is to be presented to the user.

The presentation module 214 can optimize the presentation of candidate pages to the user. The presentation module 214 can provide controlled randomization to the presentation of candidate pages so that in certain circumstances candidate pages not having the highest probability of conversion are presented to the user. The presentation module 214 also can provide attribution in connection with the presentation of candidate pages so that the user can understand why the candidate page is being recommended to the user. The presentation module 214 is discussed in more detail herein.

Figure 3:
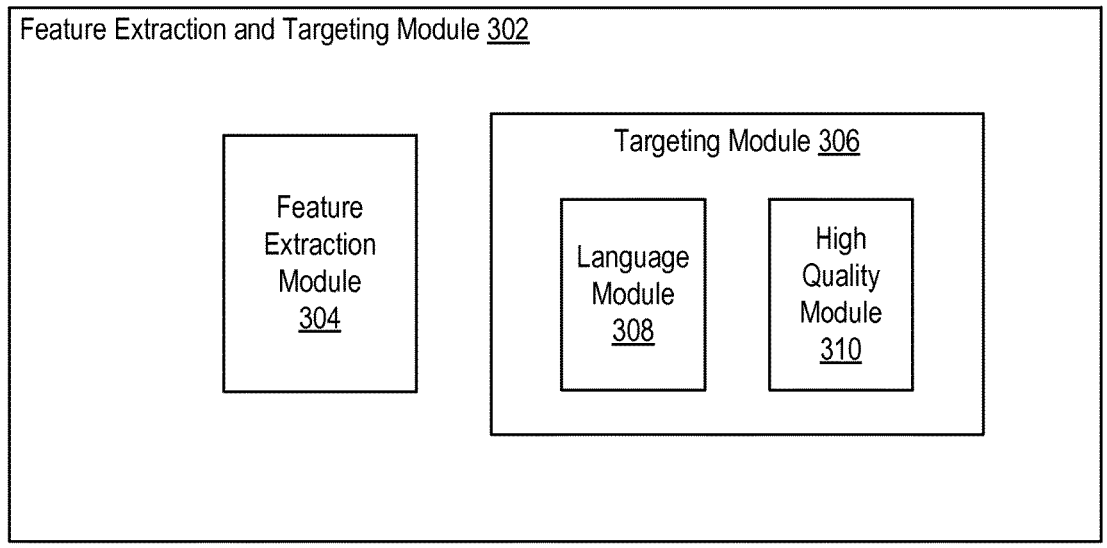
FIG. 3 illustrates an example feature extraction and targeting module, according to an embodiment of the present disclosure.

FIG. 3 illustrates an example feature extraction and targeting module 302, according to an embodiment of the present disclosure. The feature extraction and targeting module 302 can be configured to facilitate the determination of features to inform the selection of candidate pages for presentation to the user. In some embodiments, the feature extraction and targeting module 208 can be implemented by the feature extraction and targeting module 302. The feature extraction and targeting module 302 can include a feature extraction module 304 and a targeting module 306 having a language module 308 and a high quality module 310.

The feature extraction module 304 can generate various features associated with the candidate pages determined by the candidate generation module 206. The features can include any metric or parameter associated with the candidate pages (and seed pages) and online user behavior in connection with the pages. For example, the features can include a number of impressions and a number of conversions with respect to the pages. The features also can include metrics or parameters associated with user interactions based on a type (e.g., demographic profile) of the user and user interactions based on time (e.g., a past time duration). For example, a feature can include a conversion rate for a particular page based on users that are between the ages of 30-50. As another example, a feature can include a conversion rate for a particular page based on users that are between the ages of 18-29 and located in Canada. As yet another example, a feature can include a conversion rate for a particular page based on the last month. As yet still another example, a feature can include a conversion rate for a particular page based on users that are female over the last six months.

Many different types of features may be used. The features also can include, for example, the number of conversions for each of the seed page, the candidate page, and the seed page/candidate page pair and the number of impressions for each of the seed page, the candidate page, and the seed page/candidate page pair. The features also can include, for example, the ratio of the number of conversions over the number of impressions (i.e., conversion rate) for the seed page, the conversion rate for the candidate page, and the conversion rate for the seed page/candidate page pair. The features also can include, for example, the ratio of conversion rate for the seed page/candidate page pair over the conversation rate for the seed page and the ratio of the conversion rate for the seed page/candidate page pair over the conversion rate for the candidate page. The features also can include a reciprocity feature that reflects whether a first page and a second page exhibit reciprocity. Reciprocity between the first page and the second page can be deemed to exist when both the second page is determined to be a candidate page after a user has indicated approval of the first page and the first page is determined to be a candidate page after a user has indicated approval of the second page. Many other alternative and additional features may be used.

The targeting module 306 can target (or filter) candidate pages based on the features associated with the candidate pages. The language module 308 can determine the languages preferred by the user. The determination of languages preferred by the user can be based on profile information about the user or data about the historical interactions of the user with the social networking system. The data about the historical interactions of the user can reflect the languages of the types of content the user has accessed, languages of the types of content the user has uploaded, and any other data reflective of the language fluency of the user. In one embodiment, a user's language can be determined by one or more techniques, including those described in U.S. Pat. No. 8,495,143, entitled "Inferring User Profile Attributes From Social Information", filed on Oct. 29, 2010, which is incorporated by reference in its entirety herein. In some embodiments, a histogram of historical interactions of the user with pages can be used to determine one or more languages in which the user is skilled. Candidate pages in the languages preferred by the user can be prioritized for presentation to the user or candidate pages not in the languages preferred by the user can be removed from further consideration.

The high quality module 310 can prioritize candidate pages of high quality or eliminate from further consideration candidate pages of low quality. The high quality module 310 can be based in part on machine learning models that identify high quality candidate pages. However, the machine learning models have limitations in their ability to discern candidate pages that are potentially objectionable to the user (e.g., spam, porn, etc.). Thus, the results of the machine learning models are provided for manual review in a user operations process facilitated by the high quality module 310. Through manual review, the candidate pages can be further filtered or labeled according to the preferences or rules of the social networking system to optimize the probability that the user will convert. The filtered or labeled candidate pages can be tracked by the high quality module 310 so that candidate pages deemed potentially objectionable to the user are not presented to the user.

Figure 4:
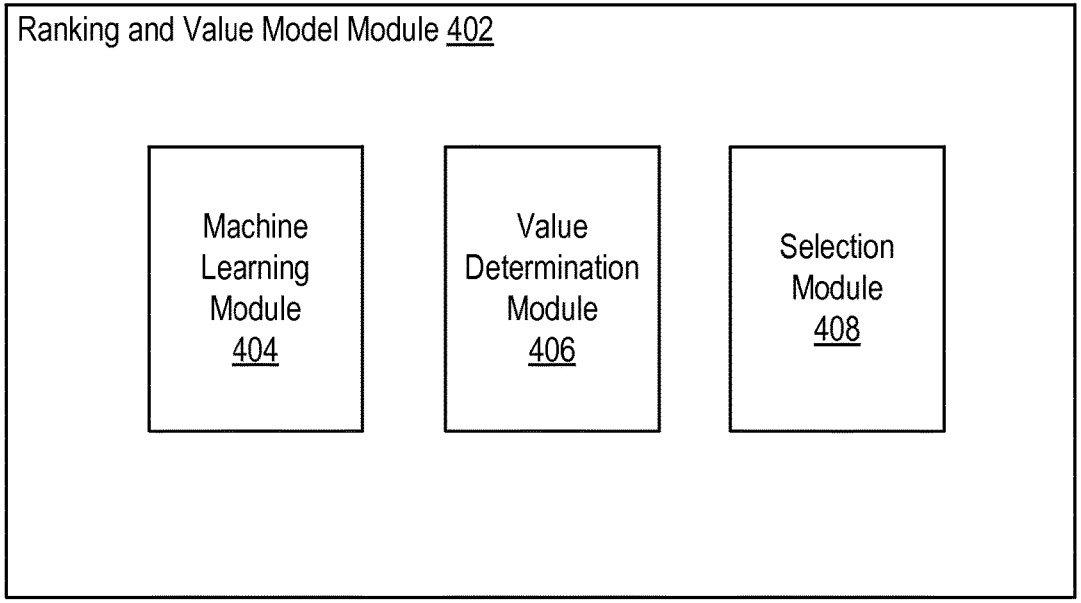
FIG. 4 illustrates an example ranking and value model module, according to an embodiment of the present disclosure.

FIG. 4 illustrates an example ranking and value model module 402, according to an embodiment of the present disclosure. The ranking and value model module 402 can determine probabilities of various user interaction with the candidate pages and assign values to the candidate pages. In some embodiments, the ranking and value model module 210 can be implemented by the ranking and value model module 402. The ranking and value model module 402 can include a machine learning module 404, a value determination module 406, and a selection module 408.

The machine learning module 404 can determine probabilities of various user interactions with candidate pages from machine learning models based on the features extracted by the feature extraction and targeting module 302. The various user interactions can include any type of user behavior performed in connection with a candidate page. The various user interactions can include but are not limited to, for example, liking a candidate page, liking a post in a news feed of a candidate page, watching a video from a candidate page, etc. The machine learning models (e.g., boosted decision trees) can be trained based on past user behavior. The machine learning models can appropriately weight the features to reflect their importance in determining the probabilities of user interactions with respect to a candidate page.

The value determination module 406 can assign a value to each candidate page based on the business importance of the predicted user interactions associated with the candidate page. The user interactions associated with the candidate page may be assigned different values. For example, assume that the machine learning module 404 has determined the probabilities that the user will share content from a candidate page with connections of the user and that the user will like a post in a news feed of the candidate page. Assume further that the user sharing content may be more valuable than a user liking a post in a news feed of the candidate page. In this example, the value determination module 406 can appropriately assign a value for the candidate page that reflects both the relatively larger value of the user sharing content and the relatively smaller value of the user liking a post in a news feed.

The selection module 408 can rank the candidate pages based on their values. In some embodiments, a threshold number of candidate pages with the highest values can be identified and the bid values associated with the identified candidate pages can be provided to the auction interface module 212. In other embodiments, candidate pages can be selected based on the satisfaction of a threshold value. When the threshold value is satisfied with respect to the value for a particular candidate page, the bid value associated with the candidate page can be provided to the auction interface module 212.

Figure 5:
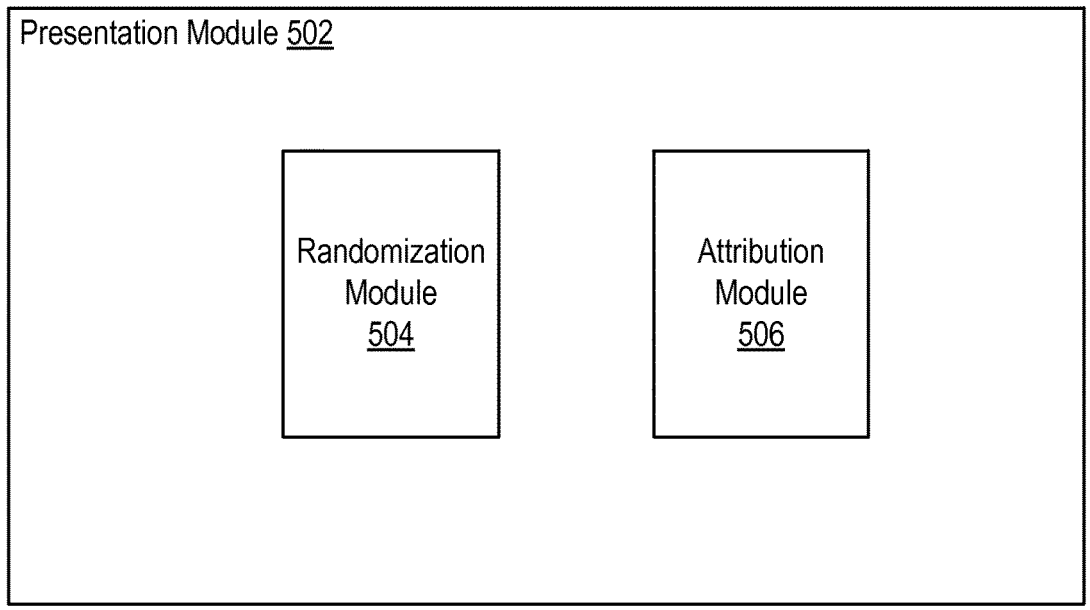
FIG. 5 illustrates an example presentation module, according to an embodiment of the present disclosure.

FIG. 5 illustrates an example presentation module 502, according to an embodiment of the present disclosure. The presentation module 502 can account for additional considerations to optimize the presentation of candidate pages for the user. In some embodiments, the presentation module 214 can be implemented by the presentation module 502. The presentation module 502 can include a randomization module 504 and an attribution module 506.

The randomization module 504 can vary the candidate pages that are selected for presentation to the user. In some embodiments, the candidate pages with the highest values are selected for presentation to the user, as discussed in more detail herein. In other embodiments, the randomization module 504 can select one or more candidate pages for presentation to the user that do not have the highest values in addition to or as an alternative to the candidate pages that have the highest values. The selection of candidate pages that do not have the highest values can be based on a confidence threshold that provides a range of acceptable values for candidate pages that can be presented to the user.

In one example, the confidence threshold may be associated with a suitable percentage (e.g., 4%, 10%, 23%, etc.) relative to a value of the candidate page having the highest value. The confidence threshold may be selected based on a desired amount of acceptable risk in the user not finding a candidate page of interest. In this example, a range can be defined by the highest value from the values associated with candidate pages and the highest value reduced by the percentage associated with the confidence threshold. The candidate pages having values within the range can be selected for presentation to the user in addition to or as an alternative to the candidate page(s) having the highest values. Other techniques to vary the candidate pages selected for presentation to the user are possible.

The attribution module 506 can provide a reference for presentation to the user. The reference can communicate to the user why the candidate page is being presented to the user. The reference can be accompany the presentation of the candidate page. The reference may indicate to the user that a particular candidate page is being presented to the user because the user, for example, lives in a particular area, is friends with another person, liked a particular content item, clicked on a particular topic, etc. The presentation of the reference along with the candidate page can facilitate conversion on the candidate page.

Figure 6:
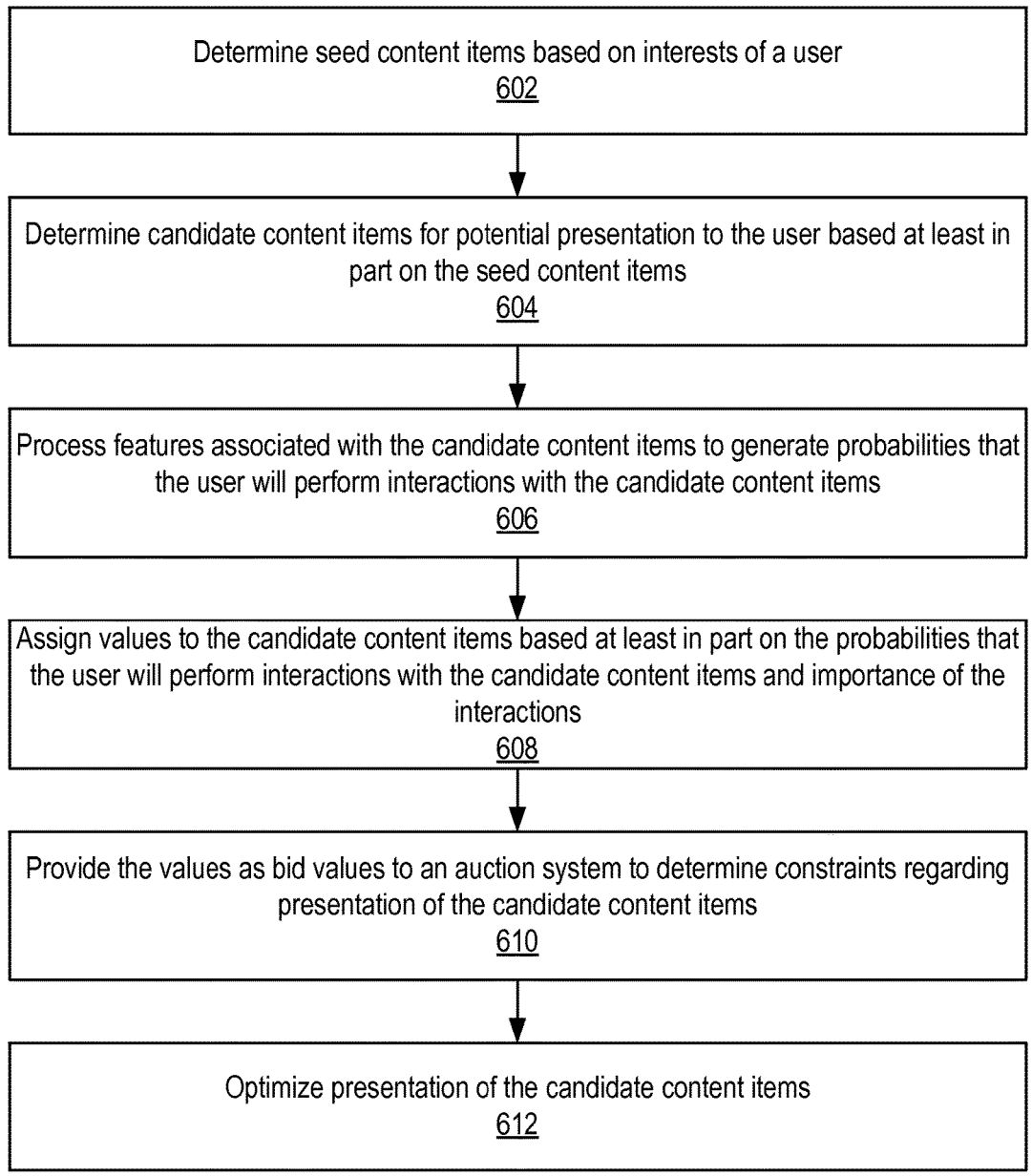
FIG. 6 illustrates an example method for providing candidate content items as recommendations, according to an embodiment of the present disclosure.

FIG. 6 illustrates an example method 600 for selection of candidate content items, according to an embodiment of the present disclosure. It should be appreciated that there can be additional, fewer, or alternative steps performed in similar or alternative orders, or in parallel, within the scope of the various embodiments unless otherwise stated.

At block 602, the method 600 can determine seed content items based on interests of a user. At block 604, the method 600 can determine candidate content items for potential presentation to the user based at least in part on the seed content items. At block 606, the method 600 can process features associated with the candidate content items to generate probabilities that the user will perform interactions with the candidate content items. At block 608, the method 600 can assign values to the candidate content items based on the probabilities that the user will perform interactions with the candidate content items and the importance of the interactions. At block 610, the method 600 can provide the values as bid values to an auction system to determine constraints regarding presentation of the candidate content items. At block 612, the method 600 can optimize presentation of the candidate content items. Other suitable techniques are possible.

Figure 7A:
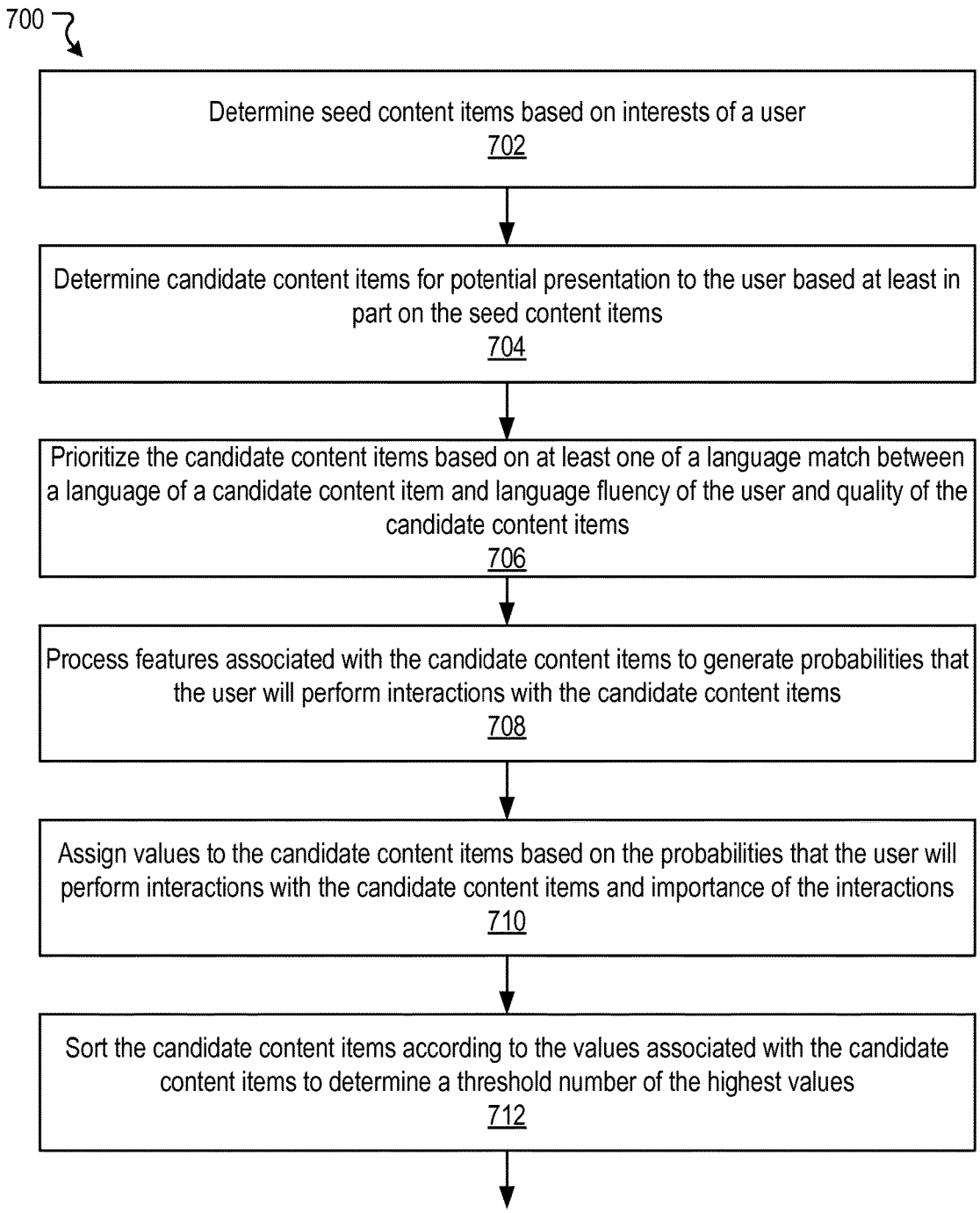
FIGS. 7A-7B illustrate an example method for providing candidate content items as recommendations, according to an embodiment of the present disclosure.
Figure 7B:
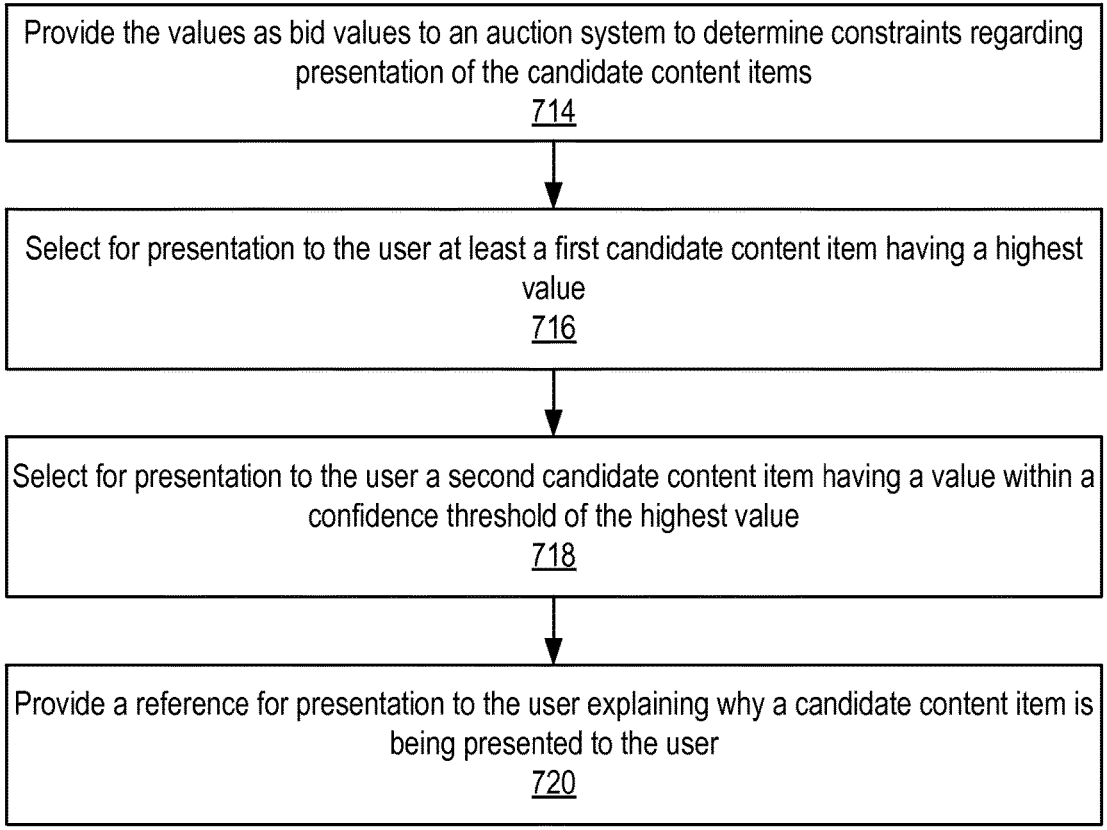

FIGS. 7A-7B illustrate an example method 700 for selection of candidate content items, according to an embodiment of the present disclosure. It should be appreciated that there can be additional, fewer, or alternative steps performed in similar or alternative orders, or in parallel, within the scope of the various embodiments unless otherwise stated.

At block 702, the method 700 can determine seed content items based on interests of a user. At block 704, the method 700 can determine candidate content items for potential presentation to the user based at least in part on the seed content items. At block 706, the method 700 can prioritize the candidate content items based on at least one of a language match between a language of a candidate content item and language fluency of the user and quality of the candidate content items. At block 708, the method 700 can process features associated with the candidate content items to generate probabilities that the user will perform interactions with the candidate content items. At block 710, the method 700 can assign values to the candidate content items based on the probabilities that the user will perform interactions with the candidate content items and the importance of the interactions. At block 712, the method 700 can sort the candidate content items according to the values associated with the candidate content items to determine a threshold number of the highest values. At block 714, the method 700 can provide the values as bid values to an auction system to determine constraints regarding presentation of the candidate content items. At block 716, the method 700 can select for presentation to the user at least a first candidate content item having a highest value. At block 718, the method 700 can select for presentation to the user a second candidate content item having a value within a confidence threshold of the highest value. At block 720, the method 700 can provide a reference for presentation to the user explaining why a candidate content item is being presented to the user. Other suitable techniques are possible.

Social Networking System—Example Implementation

Figure 8:
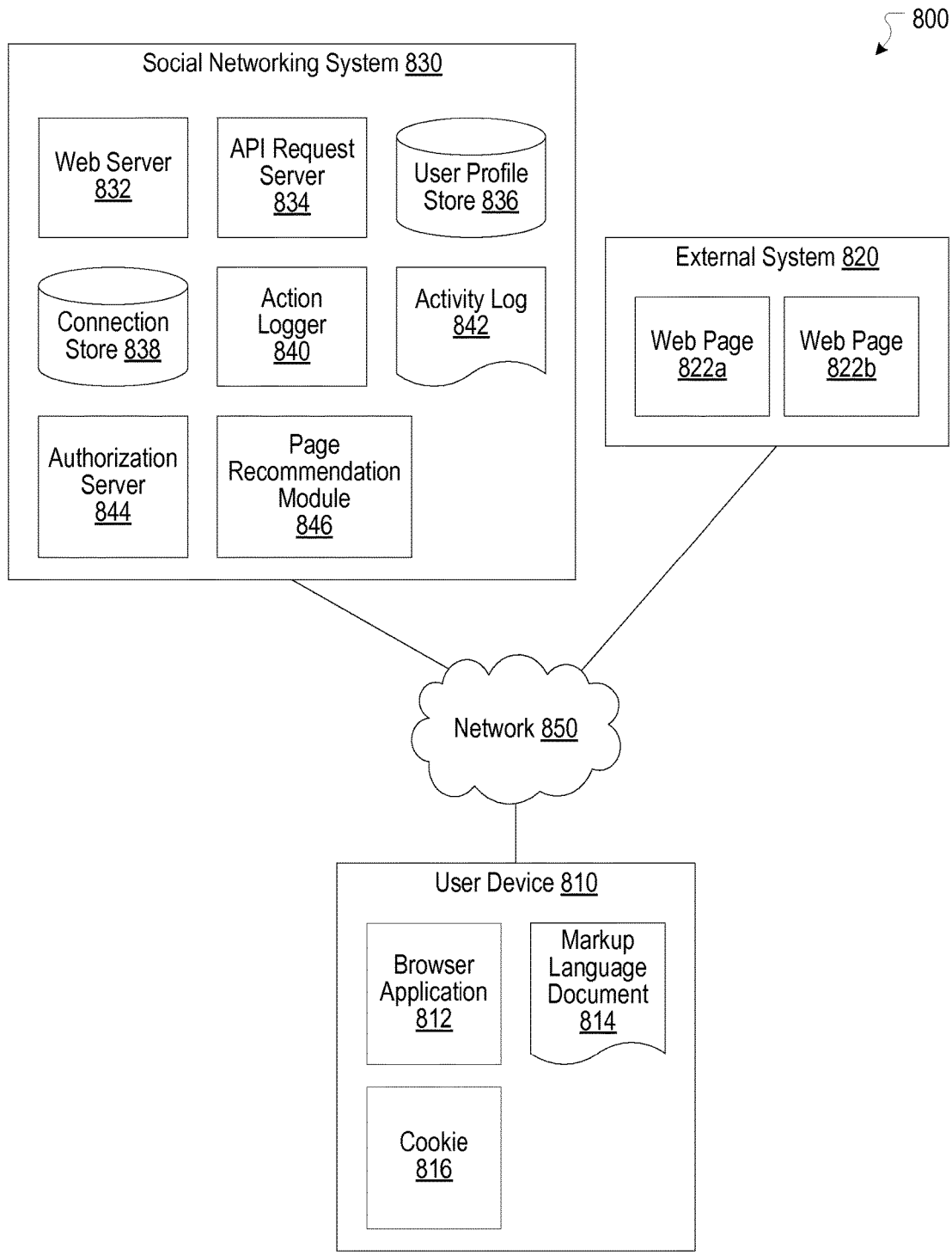
FIG. 8 illustrates a network diagram of an example system that can be utilized in various scenarios, according to an embodiment of the present disclosure.

FIG. 8 illustrates a network diagram of an example system 800 that can be utilized in various scenarios, in accordance with an embodiment of the present disclosure. The system 800 includes one or more user devices 810, one or more external systems 820, a social networking system (or service) 830, and a network 850. In an embodiment, the social networking service, provider, and/or system discussed in connection with the embodiments described above may be implemented as the social networking system 830. For purposes of illustration, the embodiment of the system 800, shown by FIG. 6, includes a single external system 820 and a single user device 810. However, in other embodiments, the system 800 may include more user devices 810 and/or more external systems 820. In certain embodiments, the social networking system 830 is operated by a social network provider, whereas the external systems 820 are separate from the social networking system 830 in that they may be operated by different entities. In various embodiments, however, the social networking system 830 and the external systems 820 operate in conjunction to provide social networking services to users (or members) of the social networking system 830. In this sense, the social networking system 830 provides a platform or backbone, which other systems, such as external systems 820, may use to provide social networking services and functionalities to users across the Internet.

The user device 810 comprises one or more computing devices that can receive input from a user and transmit and receive data via the network 850. In one embodiment, the user device 810 is a conventional computer system executing, for example, a Microsoft Windows compatible operating system (OS), Apple OS X, and/or a Linux distribution. In another embodiment, the user device 810 can be a device having computer functionality, such as a smart-phone, a tablet, a personal digital assistant (PDA), a mobile telephone, etc. The user device 810 is configured to communicate via the network 850. The user device 810 can execute an application, for example, a browser application that allows a user of the user device 810 to interact with the social networking system 830. In another embodiment, the user device 810 interacts with the social networking system 830 through an application programming interface (API) provided by the native operating system of the user device 810, such as iOS and ANDROID. The user device 810 is configured to communicate with the external system 820 and the social networking system 830 via the network 850, which may comprise any combination of local area and/or wide area networks, using wired and/or wireless communication systems.

In one embodiment, the network 850 uses standard communications technologies and protocols. Thus, the network 850 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 850 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 850 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 810 may display content from the external system 820 and/or from the social networking system 830 by processing a markup language document 814 received from the external system 820 and from the social networking system 830 using a browser application 812. The markup language document 814 identifies content and one or more instructions describing formatting or presentation of the content. By executing the instructions included in the markup language document 814, the browser application 812 displays the identified content using the format or presentation described by the markup language document 814. For example, the markup language document 814 includes instructions for generating and displaying a web page having multiple frames that include text and/or image data retrieved from the external system 820 and the social networking system 830. In various embodiments, the markup language document 814 comprises a data file including extensible markup language (XML) data, extensible hypertext markup language (XHTML) data, or other markup language data. Additionally, the markup language document 814 may include JavaScript Object Notation (JSON) data, JSON with padding (JSONP), and JavaScript data to facilitate data-interchange between the external system 820 and the user device 810. The browser application 812 on the user device 810 may use a JavaScript compiler to decode the markup language document 814.

The markup language document 814 may also include, or link to, applications or application frameworks such as FLASH™ or Unity™ applications, the SilverLight™ application framework, etc.

In one embodiment, the user device 810 also includes one or more cookies 816 including data indicating whether a user of the user device 810 is logged into the social networking system 830, which may enable modification of the data communicated from the social networking system 830 to the user device 810.

The external system 820 includes one or more web servers that include one or more web pages 822a, 822b, which are communicated to the user device 810 using the network 850. The external system 820 is separate from the social networking system 830. For example, the external system 820 is associated with a first domain, while the social networking system 830 is associated with a separate social networking domain. Web pages 822a, 822b, included in the external system 820, comprise markup language documents 814 identifying content and including instructions specifying formatting or presentation of the identified content.

The social networking system 830 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 830 may be administered, managed, or controlled by an operator. The operator of the social networking system 830 may be a human being, an automated application, or a series of applications for managing content, regulating policies, and collecting usage metrics within the social networking system 830. Any type of operator may be used.

Users may join the social networking system 830 and then add connections to any number of other users of the social networking system 830 to whom they desire to be connected. As used herein, the term "friend" refers to any other user of the social networking system 830 to whom a user has formed a connection, association, or relationship via the social networking system 830. For example, in an embodiment, if users in the social networking system 830 are represented as nodes in the social graph, the term "friend" can refer to an edge formed between and directly connecting two user nodes.

Connections may be added explicitly by a user or may be automatically created by the social networking system 830 based on common characteristics of the users (e.g., users who are alumni of the same educational institution). For example, a first user specifically selects a particular other user to be a friend. Connections in the social networking system 830 are usually in both directions, but need not be, so the terms "user" and "friend" depend on the frame of reference. Connections between users of the social networking system 830 are usually bilateral ("two-way"), or "mutual," but connections may also be unilateral, or "one-way." For example, if Bob and Joe are both users of the social networking system 830 and connected to each other, Bob and Joe are each other's connections. If, on the other hand, Bob wishes to connect to Joe to view data communicated to the social networking system 830 by Joe, but Joe does not wish to form a mutual connection, a unilateral connection may be established. The connection between users may be a direct connection; however, some embodiments of the social networking system 830 allow the connection to be indirect via one or more levels of connections or degrees of separation.

In addition to establishing and maintaining connections between users and allowing interactions between users, the social networking system 830 provides users with the ability to take actions on various types of items supported by the social networking system 830. These items may include groups or networks (i.e., social networks of people, entities, and concepts) to which users of the social networking system 830 may belong, events or calendar entries in which a user might be interested, computer-based applications that a user may use via the social networking system 830, transactions that allow users to buy or sell items via services provided by or through the social networking system 830, and interactions with advertisements that a user may perform on or off the social networking system 830. These are just a few examples of the items upon which a user may act on the social networking system 830, and many others are possible. A user may interact with anything that is capable of being represented in the social networking system 830 or in the external system 820, separate from the social networking system 830, or coupled to the social networking system 830 via the network 850.

The social networking system 830 is also capable of linking a variety of entities. For example, the social networking system 830 enables users to interact with each other as well as external systems 820 or other entities through an API, a web service, or other communication channels. The social networking system 830 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 830. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 830 modifies edges connecting the various nodes to reflect the relationships and interactions.

The social networking system 830 also includes user-generated content, which enhances a user's interactions with the social networking system 830. User-generated content may include anything a user can add, upload, send, or "post" to the social networking system 830. For example, a user communicates posts to the social networking system 830 from a user device 810. Posts may include data such as status updates or other textual data, location information, images such as photos, videos, links, music or other similar data and/or media. Content may also be added to the social networking system 830 by a third party. Content "items" are represented as objects in the social networking system 830. In this way, users of the social networking system 830 are encouraged to communicate with each other by posting text and content items of various types of media through various communication channels. Such communication increases the interaction of users with each other and increases the frequency with which users interact with the social networking system 830.

The social networking system 830 includes a web server 832, an API request server 834, a user profile store 836, a connection store 838, an action logger 840, an activity log 842, and an authorization server 844. In an embodiment of the invention, the social networking system 830 may include additional, fewer, or different components for various applications. Other components, such as network interfaces, security mechanisms, load balancers, failover servers, management and network operations consoles, and the like are not shown so as to not obscure the details of the system.

The user profile store 836 maintains information about user accounts, including biographic, demographic, and other types of descriptive information, such as work experience, educational history, hobbies or preferences, location, and the like that has been declared by users or inferred by the social networking system 830. This information is stored in the user profile store 836 such that each user is uniquely identified. The social networking system 830 also stores data describing one or more connections between different users in the connection store 838. The connection information may indicate users who have similar or common work experience, group memberships, hobbies, or educational history. Additionally, the social networking system 830 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 830, such as non-person entities, buckets, cluster centers, images, interests, pages, external systems, concepts, and the like are also stored in the connection store 838.

The social networking system 830 maintains data about objects with which a user may interact. To maintain this data, the user profile store 836 and the connection store 838 store instances of the corresponding type of objects maintained by the social networking system 830. Each object type has information fields that are suitable for storing information appropriate to the type of object. For example, the user profile store 836 contains data structures with fields suitable for describing a user's account and information related to a user's account. When a new object of a particular type is created, the social networking system 830 initializes a new data structure of the corresponding type, assigns a unique object identifier to it, and begins to add data to the object as needed. This might occur, for example, when a user becomes a user of the social networking system 830, the social networking system 830 generates a new instance of a user profile in the user profile store 836, assigns a unique identifier to the user account, and begins to populate the fields of the user account with information provided by the user.

The connection store 838 includes data structures suitable for describing a user's connections to other users, connections to external systems 820 or connections to other entities. The connection store 838 may also associate a connection type with a user's connections, which may be used in conjunction with the user's privacy setting to regulate access to information about the user. In an embodiment of the invention, the user profile store 836 and the connection store 838 may be implemented as a federated database.

Data stored in the connection store 838, the user profile store 836, and the activity log 842 enables the social networking system 830 to generate the social graph that uses nodes to identify various objects and edges connecting nodes to identify relationships between different objects. For example, if a first user establishes a connection with a second user in the social networking system 830, user accounts of the first user and the second user from the user profile store 836 may act as nodes in the social graph. The connection between the first user and the second user stored by the connection store 838 is an edge between the nodes associated with the first user and the second user. Continuing this example, the second user may then send the first user a message within the social networking system 830. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 830 (or, alternatively, in an image maintained by another system outside of the social networking system 830). The image may itself be represented as a node in the social networking system 830. This tagging action may create edges between the first user and the second user as well as create an edge between each of the users and the image, which is also a node in the social graph. In yet another example, if a user confirms attending an event, the user and the event are nodes obtained from the user profile store 836, where the attendance of the event is an edge between the nodes that may be retrieved from the activity log 842. By generating and maintaining the social graph, the social networking system 830 includes data describing many different types of objects and the interactions and connections among those objects, providing a rich source of socially relevant information.

The web server 832 links the social networking system 830 to one or more user devices 810 and/or one or more external systems 820 via the network 850. The web server 832 serves web pages, as well as other web-related content, such as Java, JavaScript, Flash, XML, and so forth. The web server 832 may include a mail server or other messaging functionality for receiving and routing messages between the social networking system 830 and one or more user devices 810. The messages can be instant messages, queued messages (e.g., email), text and SMS messages, or any other suitable messaging format.

The API request server 834 allows one or more external systems 820 and user devices 810 to call access information from the social networking system 830 by calling one or more API functions. The API request server 834 may also allow external systems 820 to send information to the social networking system 830 by calling APIs. The external system 820, in one embodiment, sends an API request to the social networking system 830 via the network 850, and the API request server 834 receives the API request. The API request server 834 processes the request by calling an API associated with the API request to generate an appropriate response, which the API request server 834 communicates to the external system 820 via the network 850. For example, responsive to an API request, the API request server 834 collects data associated with a user, such as the user's connections that have logged into the external system 820, and communicates the collected data to the external system 820. In another embodiment, the user device 810 communicates with the social networking system 830 via APIs in the same manner as external systems 820.

The action logger 840 is capable of receiving communications from the web server 832 about user actions on and/or off the social networking system 830. The action logger 840 populates the activity log 842 with information about user actions, enabling the social networking system 830 to discover various actions taken by its users within the social networking system 830 and outside of the social networking system 830. Any action that a particular user takes with respect to another node on the social networking system 830 may be associated with each user's account, through information maintained in the activity log 842 or in a similar database or other data repository. Examples of actions taken by a user within the social networking system 830 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 830, the action is recorded in the activity log 842. In one embodiment, the social networking system 830 maintains the activity log 842 as a database of entries. When an action is taken within the social networking system 830, an entry for the action is added to the activity log 842. The activity log 842 may be referred to as an action log.

Additionally, user actions may be associated with concepts and actions that occur within an entity outside of the social networking system 830, such as an external system 820 that is separate from the social networking system 830. For example, the action logger 840 may receive data describing a user's interaction with an external system 820 from the web server 832. In this example, the external system 820 reports a user's interaction according to structured actions and objects in the social graph.

Other examples of actions where a user interacts with an external system 820 include a user expressing an interest in an external system 820 or another entity, a user posting a comment to the social networking system 830 that discusses an external system 820 or a web page 822*a* within the external system 820, a user posting to the social networking system 830 a Uniform Resource Locator (URL) or other identifier associated with an external system 820, a user attending an event associated with an external system 820, or any other action by a user that is related to an external system 820. Thus, the activity log 842 may include actions describing interactions between a user of the social networking system 830 and an external system 820 that is separate from the social networking system 830.

The authorization server 844 enforces one or more privacy settings of the users of the social networking system 830. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 820, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 820. One embodiment allows the specification of the set of entities to comprise an enumeration of entities. For example, the user may provide a list of external systems 820 that are allowed to access certain information. Another embodiment allows the specification to comprise a set of entities along with exceptions that are not allowed to access the information. For example, a user may allow all external systems 820 to access the user's work information, but specify a list of external systems 820 that are not allowed to access the work information. Certain embodiments call the list of exceptions that are not allowed to access certain information a "block list". External systems 820 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 844 contains logic to determine if certain information associated with a user can be accessed by a user's friends, external systems 820, and/or other applications and entities. The external system 820 may need authorization from the authorization server 844 to access the user's more private and sensitive information, such as the user's work phone number. Based on the user's privacy settings, the authorization server 844 determines if another user, the external system 820, an application, or another entity is allowed to access information associated with the user, including information about actions taken by the user.

In some embodiments, the social networking system 830 can include a page recommendation module 846. The page recommendation module 846 can be implemented with the page recommendation module 102.

Hardware Implementation

Figure 9:
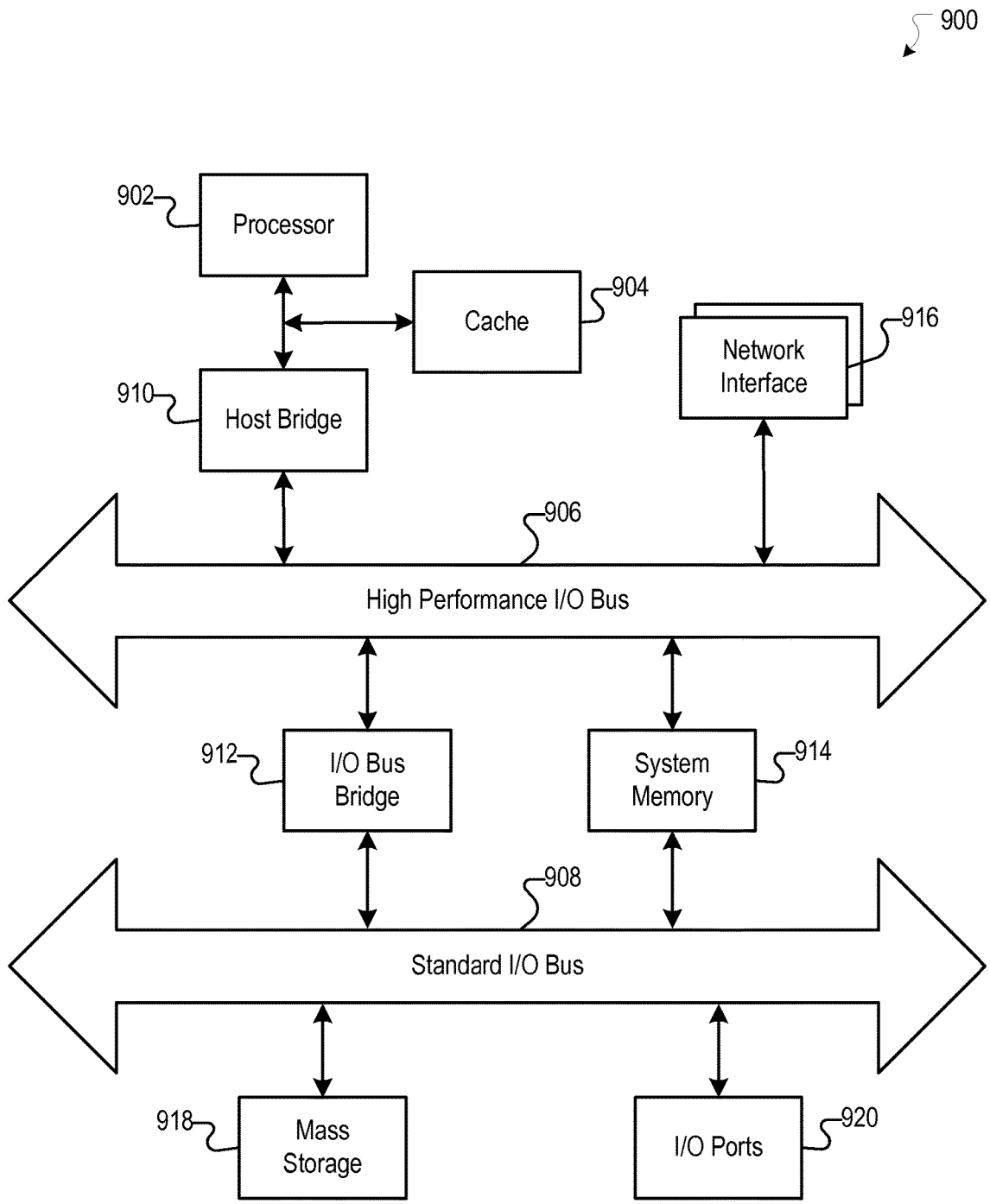
FIG. 9 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 9 illustrates an example of a computer system 900 that may be used to implement one or more of the embodiments described herein in accordance with an embodiment of the invention. The computer system 900 includes sets of instructions for causing the computer system 900 to perform the processes and features discussed herein. The computer system 900 may be connected (e.g., networked) to other machines. In a networked deployment, the computer system 900 may operate in the capacity of a server machine or a client machine in a client-server network environment, or as a peer machine in a peer-to-peer (or distributed) network environment. In an embodiment of the invention, the computer system 900 may be the social networking system 830, the user device 910, and the external system 920, or a component thereof. In an embodiment of the invention, the computer system 900 may be one server among many that constitutes all or part of the social networking system 930.

The computer system 900 includes a processor 902, a cache 904, and one or more executable modules and drivers, stored on a computer-readable medium, directed to the processes and features described herein. Additionally, the computer system 900 includes a high performance input/output (I/O) bus 906 and a standard I/O bus 908. A host bridge 910 couples processor 902 to high performance I/O bus 906, whereas I/O bus bridge 912 couples the two buses 906 and 908 to each other. A system memory 914 and one or more network interfaces 916 couple to high performance I/O bus 906. The computer system 900 may further include video memory and a display device coupled to the video memory (not shown). Mass storage 918 and I/O ports 920 couple to the standard I/O bus 908. The computer system 900 may optionally include a keyboard and pointing device, a display device, or other input/output devices (not shown) coupled to the standard I/O bus 908. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 900, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 900 are described in greater detail below. In particular, the network interface 916 provides communication between the computer system 900 and any of a wide range of networks, such as an Ethernet (e.g., IEEE 902.3) network, a backplane, etc. The mass storage 918 provides permanent storage for the data and programming instructions to perform the above-described processes and features implemented by the respective computing systems identified above, whereas the system memory 914 (e.g., DRAM) provides temporary storage for the data and programming instructions when executed by the processor 902. The I/O ports 920 may be one or more serial and/or parallel communication ports that provide communication between additional peripheral devices, which may be coupled to the computer system 900.

The computer system 900 may include a variety of system architectures, and various components of the computer system 900 may be rearranged. For example, the cache 904 may be on-chip with processor 902. Alternatively, the cache 904 and the processor 902 may be packed together as a "processor module", with processor 902 being referred to as the "processor core". Furthermore, certain embodiments of the invention may neither require nor include all of the above components. For example, peripheral devices coupled to the standard I/O bus 908 may couple to the high performance I/O bus 906. In addition, in some embodiments, only a single bus may exist, with the components of the computer system 900 being coupled to the single bus. Moreover, the computer system 900 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 900 that, when read and executed by one or more processors, cause the computer system 900 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 900, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 902. Initially, the series of instructions may be stored on a storage device, such as the mass storage 918. However, the series of instructions can be stored on any suitable computer readable storage medium. Furthermore, the series of instructions need not be stored locally, and could be received from a remote storage device, such as a server on a network, via the network interface 916. The instructions are copied from the storage device, such as the mass storage 918, into the system memory 914 and then accessed and executed by the processor 902. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 900 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   determining, by a computing system, seed content items based on interests of a user;
   determining, by the computing system, candidate content items for potential presentation to the user based at least in part on the seed content items, wherein the seed content items and the candidate content items are, respectively, seed pages and candidate pages of a social networking system;
   extracting, by the computing system, features associated with the candidate content items and related online user behavior;
   processing, by the computing system, the features to generate probabilities that the user will perform interactions with the candidate content items, wherein the processing the features further comprises applying machine learning models based on the features to generate the probabilities;
   assigning, by the computing system, values to the candidate content items based at least in part on the probabilities that the user will perform interactions with the candidate content items and importance of the interactions;
   providing, by the computing system, the values as bid values to an auction system to determine constraints regarding presentation of the candidate content items, wherein the constraints include at least one of a time constraint and a space constraint;
   optimizing, by the computing system, presentation of the candidate content items; and
   presenting, by the computing system, to the user at least a first candidate content item having a highest value.

2. The computer-implemented method of claim 1, wherein the seed content items are a subset of content items of which the user has indicated approval.

3. The computer-implemented method of claim 1, further comprising:
   prioritizing the candidate content items based on at least one of a language match between a language of a candidate content item and language fluency of the user and quality of the candidate content item.

4. The computer-implemented method of claim 1, further comprising:
   sorting the candidate content items according to the values associated with the candidate content items to determine a threshold number of the highest values, wherein the values provided as bid values to the auction system includes the threshold number of the highest values.

5. The computer-implemented method of claim 1, wherein the optimizing presentation of the candidate content items further comprises:
   selecting for presentation to the user at least a first candidate content item having a highest value.

6. The computer-implemented method of claim 5, wherein the optimizing presentation of the candidate content items further comprises:
   selecting for presentation to the user a second candidate content item having a value within a confidence threshold of the highest value.

7. The computer-implemented method of claim 1, further comprising:

providing a reference for presentation to the user explaining why a candidate content item is being presented to the user.

8. A system comprising:

at least one processor; and a memory storing instructions that, when executed by the at least one processor, cause the system to perform:

determining seed content items based on interests of a user;

determining candidate content items for potential presentation to the user based at least in part on the seed content items, wherein the seed content items and the candidate content items are, respectively, seed pages and candidate pages of a social networking system;

extracting features associated with the candidate content items and related online user behavior;

processing the features to generate probabilities that the user will perform interactions with the candidate content items, wherein the processing the features further comprises applying machine learning models based on the features to generate the probabilities;

assigning values to the candidate content items based at least in part on the probabilities that the user will perform interactions with the candidate content items and importance of the interactions;

providing the values as bid values to an auction system to determine constraints regarding presentation of the candidate content items, wherein the constraints include at least one of a time constraint and a space constraint; optimizing presentation of the candidate content items; and presenting, by the computing system, to the user at least a first candidate content item having a highest value.

9. The system of claim 8, further comprising:

prioritizing the candidate content items based on at least one of a language match between a language of a candidate content item and language fluency of the user and quality of the candidate content item.

10. The system of claim 8, further comprising:

sorting the candidate content items according to the values associated with the candidate content items to determine a threshold number of the highest values, wherein the values provided as bid values to the auction system includes the threshold number of the highest values.

11. A non-transitory computer-readable storage medium including instructions that, when executed by at least one processor of a computing system, cause the computing system to perform a method comprising:

determining seed content items based on interests of a user;

determining candidate content items for potential presentation to the user based at least in part on the seed content items, wherein the seed content items and the candidate content items are, respectively, seed pages and candidate pages of a social networking system;

extracting features associated with the candidate content items and related online user behavior;

processing the features to generate probabilities that the user will perform interactions with the candidate content items, wherein the processing the features further comprises applying machine learning models based on the features to generate the probabilities;

assigning values to the candidate content items based at least in part on the probabilities that the user will perform interactions with the candidate content items and importance of the interactions;

providing the values as bid values to an auction system to determine constraints regarding presentation of the candidate content items, wherein the constraints include at least one of a time constraint and a space constraint;

optimizing presentation of the candidate content items; and presenting, by the computing system, to the user at least a first candidate content item having a highest value.

12. The non-transitory computer-readable storage medium of claim 11, further comprising:

prioritizing the candidate content items based on at least one of a language match between a language of a candidate content item and language fluency of the user and quality of the candidate content item.

13. The non-transitory computer-readable storage medium of claim 11, further comprising:

sorting the candidate content items according to the values associated with the candidate content items to determine a threshold number of the highest values, wherein the values provided as bid values to the auction system includes the threshold number of the highest values.

* * * * *